United States Patent [19]

Liebegott

[11] 4,343,031
[45] Aug. 3, 1982

[54] HEADLIGHT ADJUSTING DEVICE FOR VEHICLES

[75] Inventor: Klaus Liebegott, Munich, Fed. Rep. of Germany

[73] Assignee: Bayerische Motoren Werke Aktiengesellschaft, Munich, Fed. Rep. of Germany

[21] Appl. No.: 46,922

[22] Filed: Jun. 8, 1979

[30] Foreign Application Priority Data

Jun. 14, 1978 [DE] Fed. Rep. of Germany ....... 2825976

[51] Int. Cl.³ .............................................. B60Q 1/00
[52] U.S. Cl. ..................................... 362/80; 362/289; 362/419
[58] Field of Search .......................... 362/80, 289, 419

[56] References Cited

U.S. PATENT DOCUMENTS

4,188,655  2/1980  Tallon et al. .......................... 362/80

Primary Examiner—Stephen J. Lechert, Jr.
Attorney, Agent, or Firm—Craig and Antonelli

[57] ABSTRACT

A headlight adjusting device for a vehicle such as an automobile is disclosed. The device comprises adjusting screws respectively arranged between one bearing at the vehicle and/or at a supporting frame mounted to the vehicle and one bearing associated with the headlight, the adjusting screws being secured in position without axial and transverse play in one of the bearings and held axially in fixed position and transversely in a movable position in the other of the bearings. These other bearings are held without play by respective elastic elements arranged at these other bearings.

7 Claims, 4 Drawing Figures

HEADLIGHT ADJUSTING DEVICE FOR VEHICLES

BACKGROUND AND SUMMARY OF THE INVENTION

The present invention relates to a headlight adjusting device for a motor vehicle such as an automobile, the device being of the type wherein adjusting screws are respectively arranged between one bearing at the vehicle and/or at a supporting frame mounted to the vehicle and one bearing associated with the headlight, the adjusting screws being secured in position without axial and transverse play in one of said bearings and held axially in fixed position and transversely in a movable position in the other of said bearings and wherein these other bearings are held without play by elastic support means.

In a conventional adjusting device of this type (DAS [German Published Application] No. 1,805,016), the bearings wherein the adjusting screws are secured in position without play in the axial and transverse directions are arranged in the supporting frame. The other bearings are constituted by slotted holes extending in the peripheral direction of the headlight reflector and formed in flanges along the periphery of the reflector. Annular grooves of the adjusting screws engage the slotted holes in such a way that, during an adjustment, a transverse movement can take place to effect distance compensation.

In this known device a single spring arranged outside of the range of the adjusting screws in the supporting frame engages the reflector and eliminates play in all other bearings. For this purpose, the spring is made to be relatively strong. Since it engages at a point outside of the adjusting screws at the reflector, this spring is thus also effective, via the adjusting screws, on the bearings which are without play anyway, and therefore acts on all bearings. This leads to a constant stress on the adjusting screws and the bearings. Furthermore, this stress makes it necessary during an adjustment of the reflector to overcome additional friction in the bearings at the supporting frame, resulting moreover in difficulties in case the adjustment process takes place with auxiliary power.

Thus, an object of the present invention is to provide an adjusting device of the type described hereinabove in a structurally simple fashion so that a stress on the bearings wherein the adjusting screws are anyway secured axially and transversely without any play, may be avoided.

This and other objects of the present invention are attained by providing that respective elastic elements are arranged at the other bearing points.

Each elastic element eliminates axial play directly at the point where the transverse movement is provided. The adjusting screws and the bearings which are without play anyway may thus be relieved, since the elastic elements are restricted in their action to the other bearings. Thereby, adjustment can be effected with a low adjusting power.

In one advantageous embodiment of the present invention the adjusting screws are respectively arranged between one bearing at a supporting frame mounted to the vehicle with mounting means and one bearing associated with the headlight, the bearings at the supporting frame being located in the direct vicinity of the mounting means of the supporting frame. With such an arrangement the weight of the reflector and/or optionally of the entire headlight is effective only between the bearings of the adjusting screws and the respectively adjacent mounting point of the supporting frame on the supporting frame, so that the latter can be manufactured of a lightweight, thermoplastic synthetic resin.

As an additional feature of the present invention the headlight includes a reflector with means being provided for fixedly holding the reflector at a point and bearings for two adjusting screws being respectively arranged in a plane horizontal and a plane vertical with respect to said point at the periphery of the reflector. Such a device is especially simple from a constructional viewpoint, the vertical and lateral adjustment of the headlight requiring in each case only one adjusting screw. Furthermore, in case of a vertical or lateral adjustment, the respectively other adjustment of the headlight is not changed.

In this last-mentioned form of the present invention an adjusting member of an illuminating range adjusting means may engage the adjusting screw in the vertical plane for vertical adjustment. There is no need with such an arrangement for a spacer ring carrying the reflector or headlight and being held without stress with respect to the car body.

In an advantageous further feature of the present invention elastic elements are U-shaped spring clips slotted in the direction of their legs, the adjusting screws engaging in the slots of the spring clips with the clips resting on their associated adjusting screw end on the reflector. An elastic element in the form of a spring clip can be manufactured in a simple way from spring steel sheet, is commercially available, and is thus economical.

These and other objects, features and advantages of the present invention will become more apparent from the following description when taken in connection with the accompanying drawings, which show, for purposes of illustration only, one embodiment in accordance with the present invention.

DETAILED DESCRIPTION OF THE DRAWINGS

Figure 1:
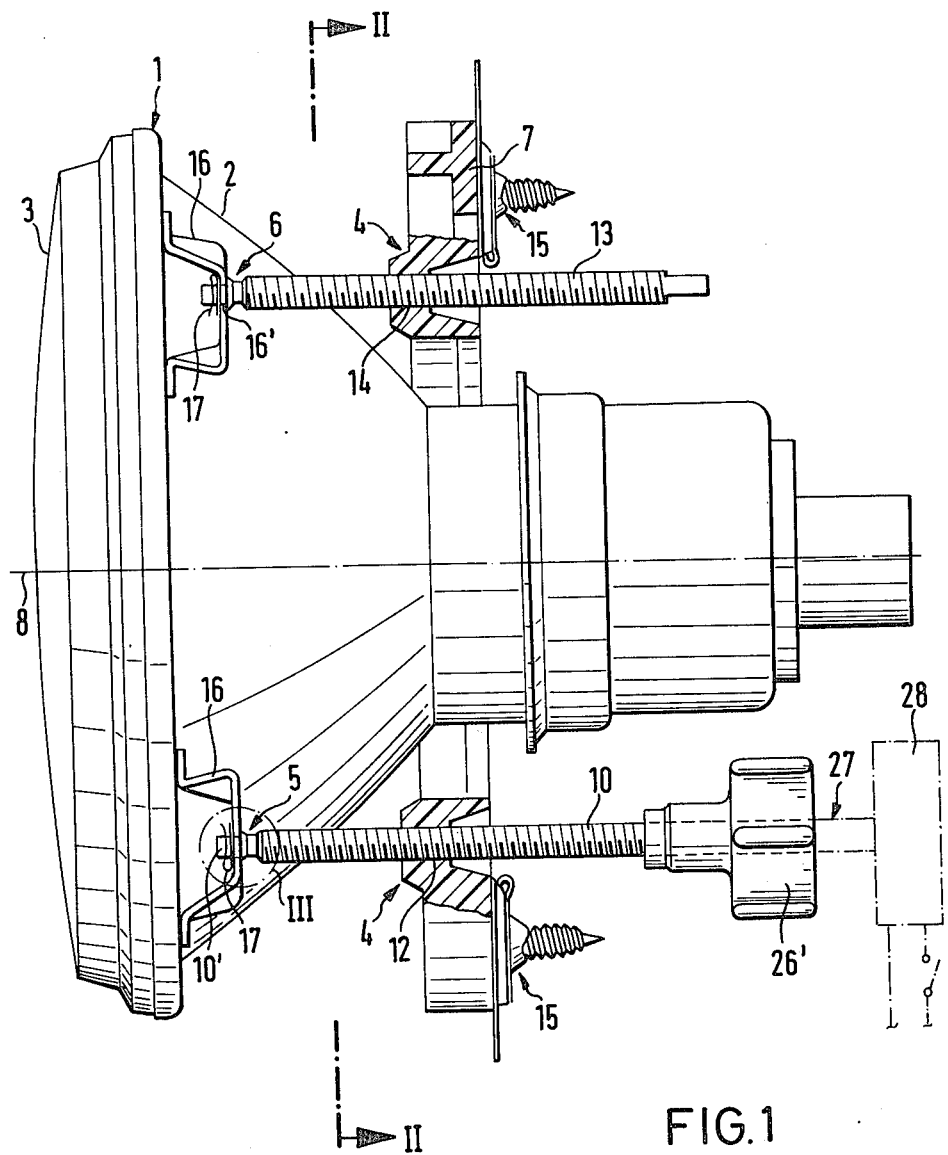
FIG. 1 is a side view partly in section of a headlight adjusting device for a vehicle according to the present invention.

In the embodiment of the present invention illustrated in the application drawings a headlight 1 with a reflector 2 and a diffuser disk 3 is mounted adjustably at three bearings 4 in a supporting frame 7 at an automotive vehicle. For this purpose, adjusting screws 9 and 10 are guided in a thread 11 and 12, respectively, in the bearings 4 (FIG. 2) which extend diagonally with respect to the axis 8 of the headlight 1. A threaded rod 13 engages a thread 14 in the third bearing 4. The supporting frame 7 is made of a synthetic resin and is held on three mountings 15 in the direct vicinity of the bearings 4 at the automotive vehicle.

The adjusting screws 9 and 10 are held in identically fashioned bearings 5, and the threaded rod 13 is held in a bearing 6, respectively by means of one spring clip 17 without axial play at the reflector 2. The bearings 5 and 6 are formed in brackets 16 on the rear side of the reflector 2. Respectively, one slotted hole 18 extending in the peripheral direction of the headlight 1 serves as the bearing 5 for the adjusting screws 9 and 10. The threaded rod 13 engages in a bore 16' as a bearing 6 of the associated bracket 16 and is held in this bore extensively without play in all directions.

Figure 3:
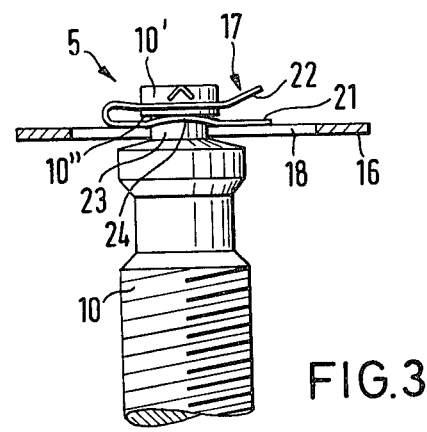
FIG. 3 is a partial sectional view of the area III in FIG. 1.
Figure 4:
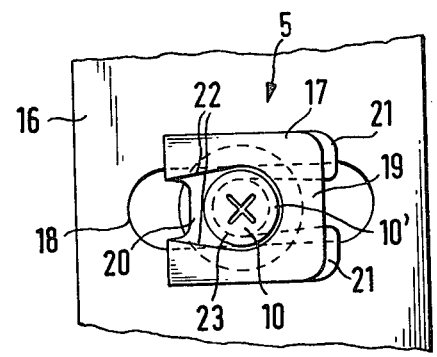
FIG. 4 is an end view of the partial section III in FIG. 3.

The spring clip 17 shown in FIGS. 1, 3, and 4 is slotted in its longitudinal extension. The resultant leg pairs 21 and 22 are connected by two cross webs 19 and 20. The open leg pair 21 extends around the adjusting screw 10 in a section 23 of tapering diameter. This leg pair rests on the bracket 16 and presses with a curved central section 24 against the underside 10" of the head 10' of the adjusting screw 10. The other, closed leg pair 22 extends around the head 10' of the adjusting screw 10.

Figure 2:
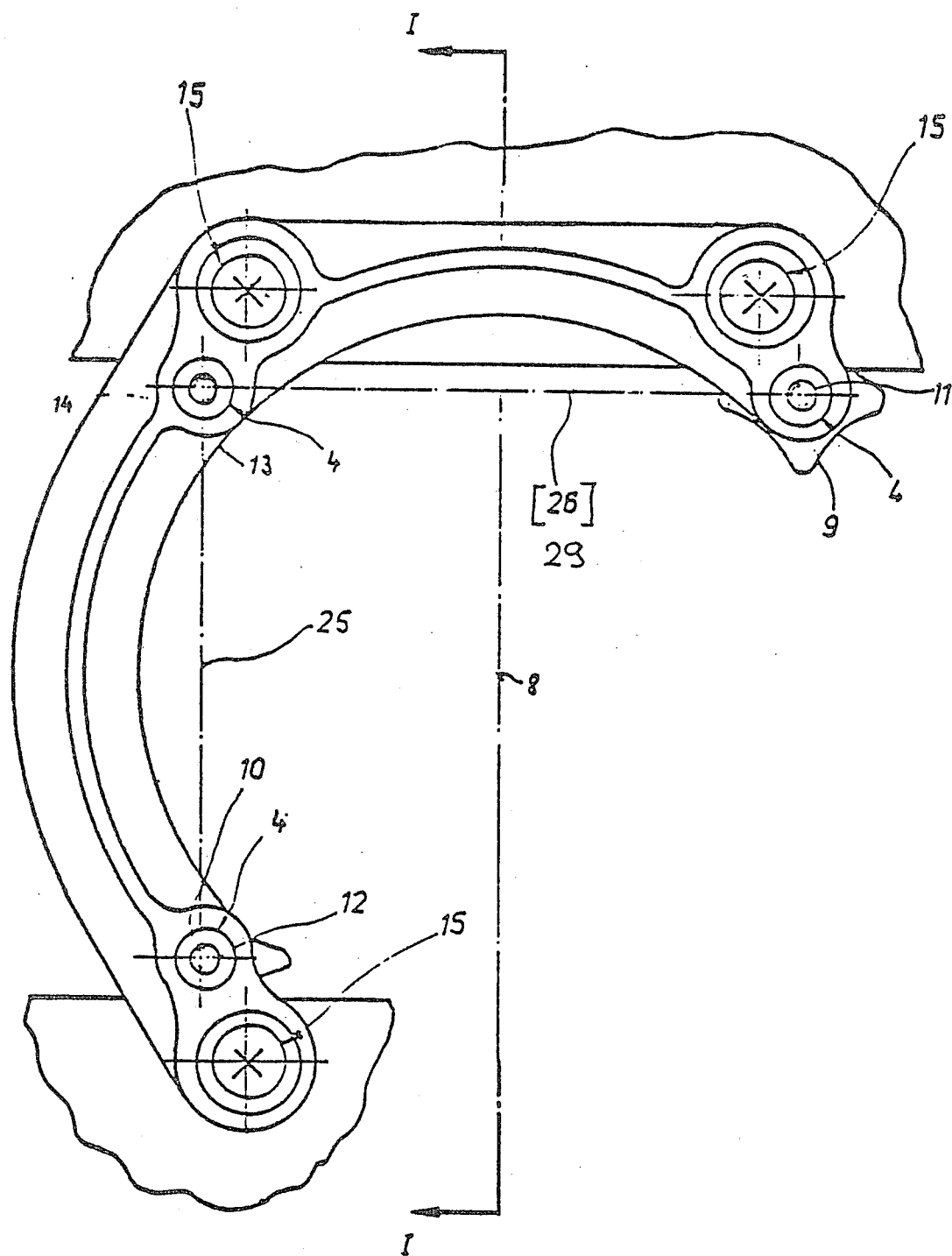
FIG. 2 is a view taken along the line II—II in FIG. 1.

To effect lateral adjustment of the headlight 1, the adjusting screw 9 is rotated so that its head changes its distance with respect to the supporting frame 7. The headlight 1 tilts about a vertical axis defined by the bearing 6 of the threaded rod 13 and the bearing 5 of the adjusting screw 10. The projection 25 of this axis is shown in FIG. 2. During this adjustment, the adjusting screw 9 slides in the slotted hole 18 of the associated bracket 16, to compensate for changes in distance, and is always guided in this hole without any play due to the spring clip 17. Due to the construction of the bearing 4, i.e. the thread 11 in the supporting frame 7, the adjusting screw 9 is securely held without play in the axial and transverse directions in this bearing.

To effect a vertical adjustment of the headlight 1, the adjusting screw 10, corresponding to the adjusting screw 9 in the lateral adjustment, is rotated, for example by means of a setting wheel or knob 26. The headlight is thereby tilted about a horizontal axis, the projection 29 of which is shown in FIG. 2. This axis is defined by the bearings 6 and 5 of the threaded rod 13 and of the adjusting screw 9, respectively. The adjusting screw 10, during this step, slides in the slotted hole of the associated bracket 16 to compensate for changes in distance.

The bearing 6 of the threaded rod 13 in the associated bracket 16, serving as the fixed point during the vertical and lateral adjustment of the headlight 1, can be brought into a basic setting by turning the threaded rod 13, and can optionally be corrected.

By arranging the bearings 4 in respectively the immediate vicinity of the mountings 15 for the supporting frame 7, it is ensured that the forces exerted by the weight of the headlight 1 on the supporting frame 7, and effective on the latter during a vertical or lateral adjustment, act only by way of a short lever arm and thus cannot deform the supporting frame.

The vertical adjustment of the headlight 1 can be accomplished, instead of doing so manually, also by means of an illuminating range adjusting means, which can, for example, be electrical. This means comprises an electric motor 28, the output shaft 27 of which engages directly the adjusting screw 10.

The bearings wherein the adjusting screws are secured in position without axial and transverse play can also be arranged at the reflector. The associated bearings, wherein the adjusting screws are held in position axially and movable transversely, and wherein respectively one elastic element is disposed as the elastic support, are then arranged at the supporting frame and/or at the automotive vehicle.

While we have shown and described only one embodiment in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

I claim:

1. A headlight adjusting device for a vehicle such as an automobile, comprising adjusting screws respectively arranged between one bearing at the vehicle and/or at a supporting frame mounted to the vehicle and one bearing associated with the headlight, said adjusting screws being secured in position without axial and transverse play in one of said bearings and held axially in fixed position and transversely in a movable position in the other of said bearings in that these other bearings holding said adjusting screws axially in fixed position and transversely in a movable position include elongate, slotted holes which receive said adjusting screws and permit transverse movement thereof during adjustment of said headlight, respective elastic elements in the form of spring clips being arranged between these other bearings and said adjusting screws to eliminate axial play between these other bearings and the adjusting screws while permitting transverse movement of the adjusting screws within the elongate, slotted holes of these other bearings during adjustment of said headlight.

2. The headlight adjusting device according to claim 1, wherein said adjusting screws are respectively arranged between one bearing at a supporting frame mounted to the vehicle with mounting means and one bearing associated with the headlight, and wherein the bearings at the supporting frame are located in the direct vicinity of the mounting means of the supporting frame.

3. The headlight adjusting device according to claim 1 or 2, wherein said headlight includes a reflector, means being provided for fixedly holding said reflector at a point and bearings for two adjusting screws being respectively arranged in a plane horizontal and a plane vertical with respect to said point at the periphery of the reflector.

4. The headlight adjusting device according to claim 3, wherein an adjusting member of an illuminating range adjusting means engages the adjusting screw in the vertical plane.

5. The headlight adjusting device according to claim 3, wherein the bearings for the two adjusting screws arranged at the periphery of said reflector are said other bearings and wherein the elastic elements are U-shaped spring clips slotted in the direction of their legs, the adjusting screws engaging in the slots of the spring clips with the spring clips resting on their associated screw and on the reflector adjacent said elongate, slotted holes of said other bearings.

6. The headlight adjusting device according to claim 1 or 2, wherein said other bearings are associated with the headlight and wherein the elastic elements are U-shaped spring clips slotted in the direction of their legs, the adjusting screws engaging in the slots of the spring clips with the spring clips resting on their associated adjusting screw and the headlight adjacent said elongate, slotted holes of said other bearings.

7. The headlight adjusting device according to claim 3, wherein said horizontal plane and said vertical plane are approximately equidistant from the midpoint of the headlight.

* * * * *